United States Patent
Ohashi (10) Patent No.: US 9,741,168 B2
(45) Date of Patent: Aug. 22, 2017

(54) VIDEO OUTPUTTING APPARATUS, THREE-DIMENTIONAL VIDEO OBSERVATION DEVICE, VIDEO PRESENTATION SYSTEM, AND VIDEO OUTPUTTING METHOD

(71) Applicant: Sony Computer Entertainment Inc., Tokyo (JP)

(72) Inventor: Yoshinori Ohashi, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/405,928

(22) PCT Filed: Apr. 18, 2013

(86) PCT No.: PCT/JP2013/002623
§ 371 (c)(1),
(2) Date: Dec. 5, 2014

(87) PCT Pub. No.: WO2014/002347
PCT Pub. Date: Jan. 3, 2014

(65) Prior Publication Data
US 2015/0123996 A1 May 7, 2015

(30) Foreign Application Priority Data
Jun. 29, 2012 (JP) .................. 2012-147343

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G06F 3/1423* (2013.01);
(Continued)

(58) Field of Classification Search
CPC ............................. G06T 19/006; G06T 19/00
(Continued)

(56) References Cited

U.S. PATENT DOCUMENTS

2006/0132915 A1 6/2006 Yang et al.
2008/0024597 A1 1/2008 Yang et al.
(Continued)

FOREIGN PATENT DOCUMENTS

EP 2 421 276 2/2012
JP 2001-028765 1/2001
(Continued)

OTHER PUBLICATIONS

International Search Report dated Jun. 25, 2013 from International Application No. PCT/JP2013/002623.
(Continued)

*Primary Examiner* — Jin Ge
(74) *Attorney, Agent, or Firm* — Katten Muchin Rosenman LLP (57) ABSTRACT

An object classification unit 504 classifies objects placed in a virtual three-dimensional space into objects to be displayed on an optical transmission type HMD and objects to be displayed on a monitor 300 which is observed through the optical transmission type HMD. A video outputting unit 506 outputs a video of each object to the monitor 300 or the optical transmission type HMD based on a classification by the object classification unit 504.

10 Claims, 8 Drawing Sheets

(51) Int. Cl.
*H04N 13/04* (2006.01)
*G02B 27/01* (2006.01)
*G06F 3/14* (2006.01)
*G09G 3/00* (2006.01)

(52) U.S. Cl.
CPC ... *H04N 13/044* (2013.01); *G02B 2027/0178* (2013.01); *G09G 3/003* (2013.01); *G09G 2300/023* (2013.01); *G09G 2320/0261* (2013.01)

(58) Field of Classification Search
USPC .......................................................... 345/633
See application file for complete search history.

(56) References Cited

U.S. PATENT DOCUMENTS

| | | | |
|---|---|---|---|
| 2010/0091096 | A1 | 4/2010 | Oikawa et al. |
| 2012/0002024 | A1* | 1/2012 | Choi .................. H04N 5/60 348/54 |
| 2012/0056875 | A1* | 3/2012 | Lee ................... G06F 3/012 345/419 |
| 2012/0127284 | A1* | 5/2012 | Bar-Zeev ........... G02B 27/017 348/53 |
| 2012/0154557 | A1* | 6/2012 | Perez ............... H04N 21/25891 348/53 |
| 2013/0038702 | A1* | 2/2013 | Schweitzer ........... A63J 25/00 348/51 |
| 2013/0069985 | A1* | 3/2013 | Wong .................. G02B 27/017 345/633 |
| 2013/0291017 | A1* | 10/2013 | Cho .................... H04N 13/007 725/45 |

FOREIGN PATENT DOCUMENTS

| | | |
|---|---|---|
| JP | 2002-244074 | 8/2002 |
| JP | 2002-247602 | 8/2002 |
| JP | 2006-277239 | 10/2006 |
| JP | 2011-010126 | 1/2011 |

OTHER PUBLICATIONS

Japanese Notification of Reasons for Refusal dated Jun. 18, 2013 from Application No. 2012-147343.
International Preliminary Report on Patentability and Written Opinion of the International Searching Authority dated Jan. 8, 2015 from corresponding Application No. PCT/JP2013/002623.
European Search Report dated Nov. 6, 2015 from corresponding Application No. 13809316.6.
Chinese Office Action dated Feb. 3, 2016 from corresponding Application No. 201380031820.0.

* cited by examiner

VIDEO OUTPUTTING APPARATUS, THREE-DIMENTIONAL VIDEO OBSERVATION DEVICE, VIDEO PRESENTATION SYSTEM, AND VIDEO OUTPUTTING METHOD

TECHNICAL FIELD

The present invention relates a video outputting apparatus, a three-dimensional video observation device, a video presentation system including the video outputting apparatus and the three-dimensional video observation device, and a video outputting method.

BACKGROUND ART

In recent years, development of a technology for presenting a three-dimensional video has progressed, and a head-mounted display unit (Head Mounted Display; hereinafter referred to as "HMD") which can present a three-dimensional video having depth has become widespread. Among such HMDs, also an optical transmission type HMD which uses a holographic element, a half mirror or the like to present a three-dimensional video to a user while the user can observe a state of an outside of the HMD in a see-through fashion has been developed. In recent years, improvement in performance of television monitors has progressed, and a three-dimensional monitor which can present a three-dimensional video having depth has become widespread. Although various systems for implementing such a three-dimensional monitor as just described have been proposed, all systems implement three-dimensional video representation having depth by presenting parallax images to a user. Such three-dimensional monitors can present also a two-dimensional video similarly to popular television monitors.

SUMMARY

Technical Problem

A user who wears an optical transmission type HMD can view also a video of a television monitor through the HMD. The inventor of the present application has recognized a possibility that a new video representation using two display devices can be implemented by presenting videos in an interlocked relationship on both of the optical transmission type HMD and the television monitor.

The present invention has been made in view of such a subject as just described, and it is an object of the present invention to provide a technology for representing a three-dimensional video using both of a monitor and an optical transmission type HMD.

Solution to Problem

In order to solve the subject described above, a mode of the present invention is a video outputting apparatus. This apparatus includes an object classification unit configured to classify objects placed in a virtual three-dimensional space into objects to be displayed on an optical transmission type HMD and objects to be displayed on a monitor which is observed thorough the optical transmission type HMD; and a video outputting unit configured to output a video of an object to the monitor or the optical transmission type HMD based on the classification by the object classification unit.

Another mode of the present invention is a three-dimensional video observation device. This device includes an optical shutter for observing a three-dimensional monitor of a frame sequential type; and an optical transmission type HMD.

A further mode of the present invention is a video presentation system. This system includes a three-dimensional monitor of a frame sequential type; a three-dimensional video observation device including an optical transmission type HMD and an optical shutter to be used for observation of the three-dimensional monitor; an object classification unit configured to classify objects placed in a virtual three-dimensional space into objects to be displayed on the optical transmission type HMD and objects to be displayed on the three-dimensional monitor; and a video outputting unit configured to output a video of an object to the monitor or the optical transmission type HMD based on the classification by the object classification unit.

A still further mode of the present invention is a video outputting method. In the method, a processor is executed to classify objects placed in a virtual three-dimensional space into objects to be displayed on an optical transmission type HMD and objects to be displayed on a monitor which is observed through the optical transmission type HMD by a user who wears the optical transmission type HMD and output a video of each object to the monitor or the optical transmission type HMD.

A yet further mode of the present invention is a program which causes a computer to implement the steps of the method described above.

This program may be provided as part of firmware incorporated in an apparatus in order to carry out basic control of hardware resources such as video and audio decoders. This firmware is stored in a semiconductor memory such as, for example, a ROM (Read Only Memory) or a flash memory in the apparatus. In order to provide this firmware or in order to update part of the firmware, a computer-readable recording medium on or in which this program is recorded may be provided, and the program may be transmitted by a communication line.

It is to be noted that also an arbitrary combination of the components described above and the representations of the present invention by conversion between or among a method, an apparatus, a system, a computer program, a data structure, a recording medium and so forth are effective as modes of the present invention.

Advantageous Effect of Invention

With the present invention, a technology for representing a three-dimensional video using both of a monitor and an optical transmission type HMD can be provided.

DESCRIPTION OF EMBODIMENTS

An embodiment of the present invention is described. In the embodiment of the present invention, objects placed in a virtual three-dimensional space are classified, in a unit of an object, into objects to be displayed on a monitor and objects to be displayed on an optical transmission type HMD. Then, each object is displayed on the monitor or the optical transmission type HMD based on the classification.

Figure 1:
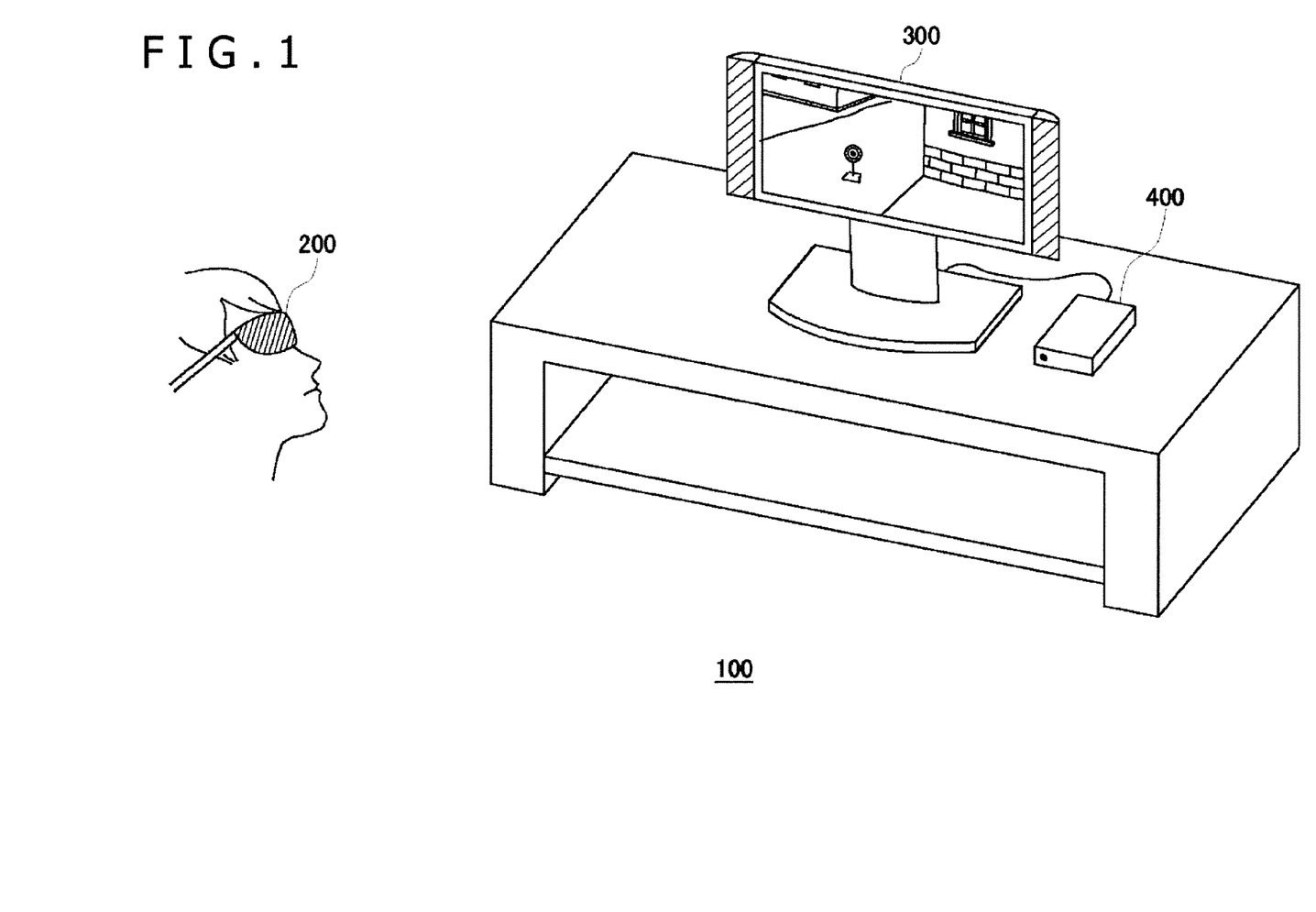
FIG. 1 is a view schematically depicting a general configuration of a video presentation system according to an embodiment.

FIG. 1 is a view schematically depicting a general configuration of a video presentation system 100 according to the embodiment. The video presentation system 100 according to the embodiment includes a three-dimensional video observation device 200, a monitor 300 and an information processing apparatus 400.

The monitor 300 displays at least part of a reproduced screen image of a content outputted from the information processing apparatus 400. Although the monitor 300 can be implemented using a popular television monitor which displays a two-dimensional video, preferably the monitor 300 is a three-dimensional monitor in order to implement a video representation having a deeper sense of immersion. In the following description in the present specification, it is assumed that the monitor 300 is a three-dimensional monitor. It is to be noted that the three-dimensional monitor has also a function of a popular television monitor which displays a two-dimensional image.

The monitor 300 displays a three-dimensional video. Since the left and right eyes of the human being are spaced from each other by approximately 6 cm, a parallax occurs between an image observed from the left eye and an image observed from the right eye. It is said that a brain of human being utilizes parallax images perceived by the left and right eyes as a single piece of information for recognizing the depth. Therefore, if the parallax image perceived by the left eye and the parallax image perceived by the right eye are projected to the respective eyes, then they are recognized as a video having depth by the human being.

Various systems have been proposed to implement a three-dimensional monitor. For example, where the monitor 300 is a three-dimensional television set of the frame sequential type, the monitor 300 displays a parallax image for the left eye and a parallax image for the right eye alternately in a time-divisional relationship. In this instance, the three-dimensional video observation device 200 is an optical transmission type HMD and besides includes an optical shutter (not depicted) for observing the monitor 300. The optical shutter opens and closes left and right shutters in synchronism with changeover between parallax images of the monitor 300. More particularly, when the monitor 300 displays a parallax image for the left eye, the shutter for the right eye is closed and the shutter for the left eye is opened so that the parallel image for the left eye is presented to the user who wears the three-dimensional video observation device 200. On the contrary, when the monitor 300 displays a parallax image for the right eye, the shutter for the left eye is closed and the shutter for the right eye is opened so that the parallax image for the right eye is presented to the user. The optical shutter can be implemented, for example, using a known liquid crystal shutter.

The three-dimensional video observation device 200 receives a synchronizing signal for shutter changeover. The synchronizing signal is transmitted from a signal transmission unit not depicted provided in the monitor 300 or the information processing apparatus 400 wirelessly, for example, using infrared rays or the like.

On the other hand, where the monitor 300 is a three-dimensional television set of a polarization type, a polarizing sheet is pasted to a surface of the monitor 300. This polarizing sheet is pasted such that, for example, a direction of polarization is different between odd-numbered lines and even-numbered lines as counted downwardly from a top of the monitor 300. The three-dimensional video observation device 200 includes polarizing lenses, and the lens for the left eye polarizes light so that the left eye can see light passing, for example, through the odd-numbered lines of the liquid crystal panel while the lens for the right eye polarizes light passing through the even-numbered lines of the liquid crystal panel. Consequently, appropriate parallax images are presented to the eyes of the user.

In any of the systems, the monitor 300 can be implemented using a known technology such as a liquid crystal television set, a plasma display unit, an organic EL monitor, or a polarizing plate.

The information processing apparatus 400 acquires a three-dimensional video for being presented by the video presentation system 100 and the synchronizing signal described hereinabove. As an example of the information processing apparatus 400, for example, a game machine of the placed type and a portable game machine are available. The information processing apparatus 400 uses a processor built therein to produce a three-dimensional video or a synchronizing signal or acquires a three-dimensional video from a different information processing apparatus such as a server through a network interface not depicted.

Figure 2:
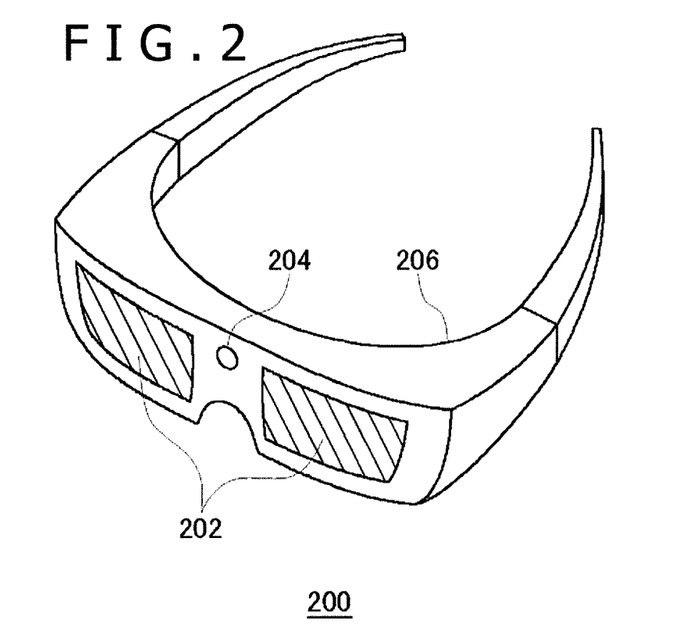
FIG. 2 is a view schematically depicting an example of an appearance of a three-dimensional video observation device according to the embodiment.

FIG. 2 is a view schematically depicting an example of an appearance of the three-dimensional video observation device 200 according to the embodiment. The three-dimensional video observation device 200 includes a presentation unit 202 for presenting a three-dimensional video, an image pickup element 204, and a housing 206 which accommodates various modules therein.

The presentation unit 202 includes an optical transmission type HMD which presents a three-dimensional video to the eyes of the user. The presentation unit 202 further includes a liquid crystal shutter, a polarizing lens or the like for changing a transmittance of light of the outside world which passes, for example, through the optical transmission type HMD in accordance with the type of the three-dimensional monitor. The image pickup element 204 picks up an image of an image pickup object existing in a region including a field of view of the user who wears the three-dimensional video observation device 200. Therefore, when the user wears the three-dimensional video observation device 200, the image pickup element 204 is placed at a location between eyebrows of the user. The image pickup element 204 can be implemented using a known solid-state image pickup element such as, for example, a CCD (Charge Coupled Device) image sensor or a CMOS (Complementary Metal Oxide Semiconductor) image sensor.

The housing 206 plays a role of a frame of the three-dimensional video observation device 200 of a shape of the eyeglasses and accommodates therein various modules (not depicted) which are utilized by the three-dimensional video observation device 200. The modules utilized by the three-dimensional video observation device 200 may be an optical engine including a hologram light guide plate for implementing the optical transmission type HMD, a driver and/or a synchronizing signal reception unit for driving the liquid crystal shutter, a communication module such as a Wi-Fi (registered trademark) module, an electronic compass, an acceleration sensor, a tilt sensor, a GPS (Global Positioning System) sensor, an illuminance sensor and so forth. The modules mentioned are exemplary, and the three-dimensional video observation device 200 need not necessarily incorporate all of such modules. Which module or modules should be incorporated may be determined in response to utilization scenes supposed for the three-dimensional video observation device 200.

FIG. 2 is a view exemplifying the three-dimensional video observation device 200 of eyeglasses type. Although the shape of the three-dimensional video observation device 200 may have other various variations such as a shape of a hat, a shape of a belt which surrounds and is fixed to the head of the user, and a shape of a helmet which covers an entire head of the user, it can be recognized readily by those skilled in the art that the three-dimensional video observation device 200 of any shape is included in the embodiment of the present invention.

Figure 3:
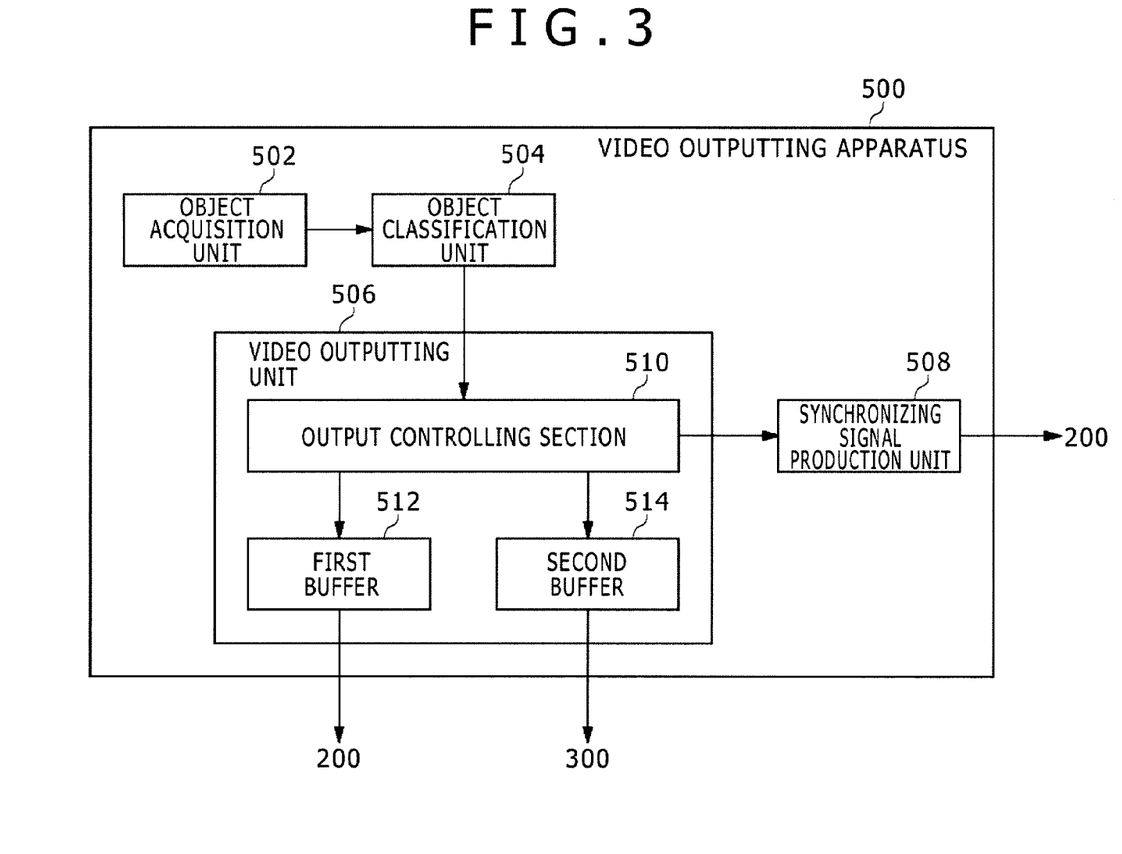
FIG. 3 is a view schematically depicting an internal configuration of a video outputting apparatus according to the embodiment.

FIG. 3 is a view schematically depicting an internal configuration of a video outputting apparatus 500 according to the embodiment. The video outputting apparatus 500 according to the embodiment is implemented as part of the information processing apparatus 400 described hereinabove. Alternatively, the video outputting apparatus 500 may be implemented in a server which produces a three-dimensional video for being transmitted to the information processing apparatus 400 through a network such as the Internet or may be built in the three-dimensional video observation device 200 or the monitor 300. Alternatively, further the video outputting apparatus 500 may be an independent single apparatus. The following description is given on an assumption that the video outputting apparatus 500 according to the embodiment is implemented as part of the information processing apparatus 400 described hereinabove. Further, although the following description is given on an assumption that the monitor 300 is a three-dimensional television set of the frame sequential type for the convenience of description, it is apparent to those skilled in the art that the present invention is materialized also with a three-dimensional television set of any other type such as, for example, the polarizing type.

The video outputting apparatus 500 according to the embodiment includes an object acquisition unit 502, an object classification unit 504, a video outputting unit 506, and a synchronizing signal production unit 508.

The object acquisition unit 502 produces and acquires a three-dimensional video for being presented by the video presentation system 100. Here, the three-dimensional video is, for example, a three-dimensional CG (Computer Graphics) video produced by a game application.

The object acquisition unit 502 sets an object, which configures a three-dimensional video, in a virtual three-dimensional space. Here, the "object" in the present specification is a set of polygons (polygon) which become elements of rendering in three-dimensional CG, and the polygons have common coordinate axes and have a meaning as a unity. In particular, the "object" is a set of polygons which represent a body such as a tree, a house, or a car or a set of polygons which represent a person such as a character or a creature which becomes an operation target of the user. Since a set of polygons which configure an "object" have common coordinate axes, a position or a direction of the object can be specified in the virtual three-dimensional space.

For example, where it is represented that an object representative of a "tree" is cut down from a root, the "tree" erected uprightly in the virtual three-dimensional space is rendered such that it is tilted gradually in the three-dimensional space around the root. At this time, the coordinates of the polygons which configure the object of the "tree" can be determined by calculating coordinate transformation of rotation around a center axis. Such operations can be implemented by arithmetic operation of linear transformation which uses a known 4×4 transformation matrix together with scale conversion for expansion or reduction.

The object classification unit 504 classifies a plurality of objects placed in the virtual three-dimensional space into objects to be displayed on the optical transmission type HMD and objects to be displayed on the monitor 300 which is observed by the user who wears the optical transmission type HMD. Details of the classification of objects by the object classification unit 504 are hereinafter described.

The video outputting unit 506 outputs a video of objects to the optical transmission type HMD in the monitor 300 or the three-dimensional video observation device 200 based on the classification by the object classification unit 504. To this end, the video outputting unit 506 includes an output controlling section 510, a first buffer 512, and a second buffer 514.

The first buffer 512 stores a video of objects to be outputted to the optical transmission type HMD in the three-dimensional video observation device 200. The second buffer 514 stores a video of objects to be displayed on the monitor 300. Here, the first buffer 512 and the second buffer 514 may be buffers physically different from each other or may be a physically same buffer used divisionally as such.

The output controlling section 510 stores a video of objects to be outputted to the optical transmission type HMD into the first buffer 512 and stores a video of objects to be displayed on the monitor 300 into the second buffer 514 in accordance with the classification by the object classification unit 504. Here, in order for the optical transmission type HMD to display a parallax image for the left eye and a parallax image for the right eye at the same time, the output controlling section 510 stores a parallax image for the left eye and a parallax image for the right eye of objects at the same time into the first buffer 512. On the other hand, in order for the monitor 300 to display a parallax image for the left eye and a parallax image for the right eye alternately and time-divisionally, the output controlling section 510 stores a parallax image for the left eye and a parallax image for the right eye alternately into the second buffer 514.

The synchronizing signal production unit 508 produces a synchronizing signal for controlling opening/closing of the optical shutter in the three-dimensional video observation device 200 in accordance with a timing at which the output controlling section 510 stores an image into the second buffer 514. The three-dimensional video observation device 200 receives the synchronizing signal produced by the synchronizing signal production unit 508 and opens or closes the optical shutter in accordance with the received synchronizing signal.

In the following, the classification of an object by the object classification unit 504 is described particularly.

Figure 4:
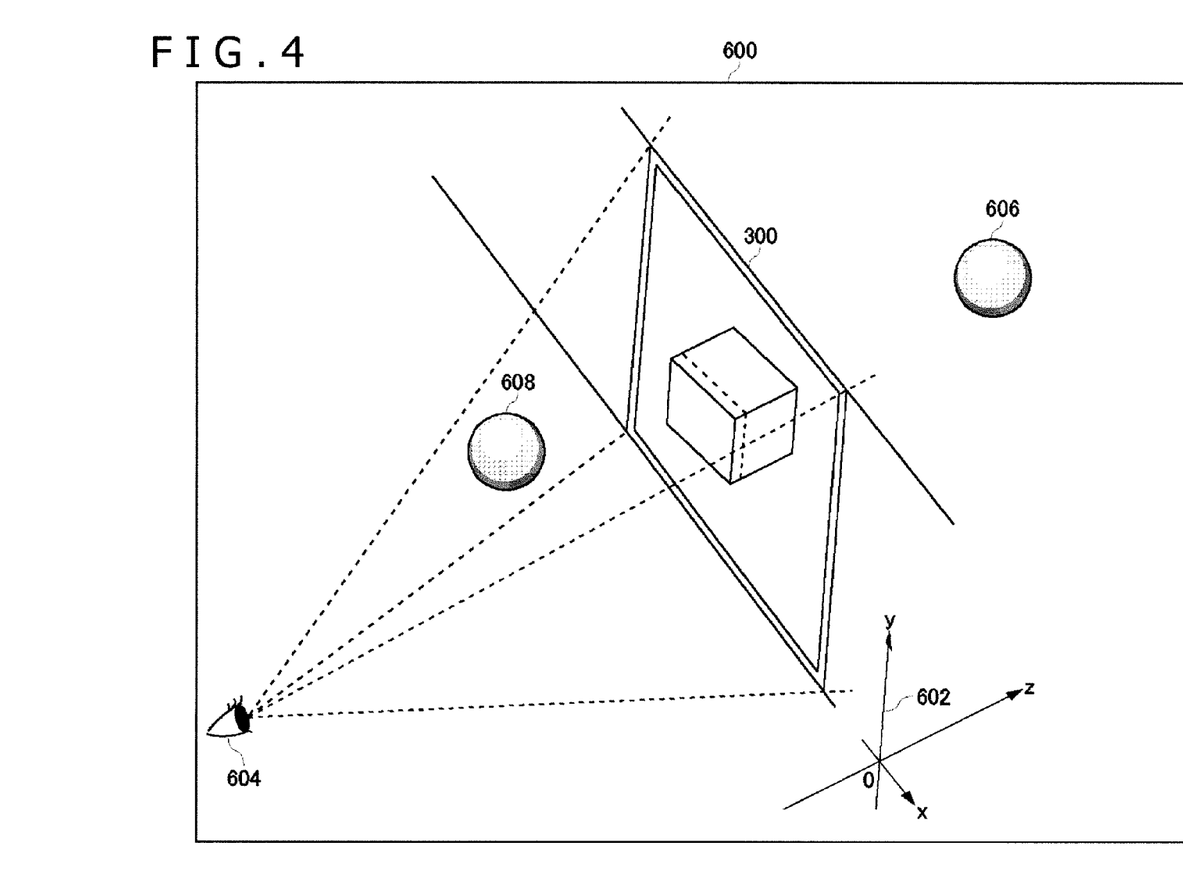
FIG. 4 is a view schematically illustrating a relationship of a monitor and a field of view of a user to a virtual three-dimensional space and an object placed in the virtual three-dimensional space.

FIG. 4 is a view schematically illustrating a relationship of a virtual three-dimensional space and an object placed in the virtual three-dimensional space to the monitor 300 and the field of view of the user. As depicted in FIG. 4, in the virtual three-dimensional space, an orthogonal coordinate system 602 having an x axis, a y axis, and a z axis is set. Here, the orthogonal coordinate system 602 is set such that an xy plane defined by the x axis and the y axis of the orthogonal coordinate system 602 extends in parallel to a display area of the monitor 300. More particularly, it is preferable to set an origin O of the orthogonal coordinate system 602 such that the display area of the monitor 300 overlaps with the xy plane defined by the x axis and the y axis of the orthogonal coordinate system 602. Further, the z axis of the orthogonal coordinate system 602 is set such that a negative z coordinate value is exhibited by a visual point 604 side of the user who wears the three-dimensional video observation device 200 with respect to the display area of the monitor 300 and a positive z coordinate value is exhibited by the opposite side to the visual point 604 with respect to the display area of the monitor 300.

For example, in FIG. 4, a spherical object 606 is disposed on the opposite side to the visual point 604 with respect to the xy plane in the virtual three-dimensional space. Accordingly, the value of the z coordinate of the spherical object 606 is in the positive. On the contrary, another spherical object 608 is disposed on the visual point 604 side with respect to the xy play in the virtual three-dimensional space, and therefore, the z coordinate value of the spherical object 608 is in the negative. Here, as a coordinate of an object in the virtual three-dimensional space, for example, a coordinate value of a center of gravity of a plurality of polygons which configure the object is used. Consequently, even if a plurality of polygons configure an object, a position coordinate of the object can be represented by a single coordinate, and therefore, suppression in calculation cost and improvement in processing speed can be anticipated.

Incidentally, since the monitor 300 of the frame sequential type displays a parallax image for the left eye and a parallax image for the right eye alternately and time-divisionally, the frame rate of videos is lower than that when the monitor 300 displays a two-dimensional image. Further, it is considered that, although the monitor 300 of the frame sequential type is generally good at representation of a sense of depth of a video, namely, at presentation of an object disposed on the opposite side to the visual point 604 with respect to the xy plane in the virtual three-dimensional space, in comparison with representation of a sense of depth, the monitor 300 is poor at representation of protrusion, namely, presentation of an object disposed on the visual point 604 side with respect to the xy play in the virtual three-dimensional space.

In contrast, since the HMD is not of the frame sequential type, the frame rate of videos presented by the HMD is higher than that of videos presented by the monitor 300. Further, it is considered that the HMD is good also at representation of protrusion in comparison with a video presented by the monitor 300. Meanwhile, a resolution of a video presented by the HMD has a tendency that it is lower than that of a video presented by the monitor 300.

The inventor of the present application recognized that, if objects are individually classified into objects to be displayed on the monitor 300 and objects to be displayed on the HMD taking natures of the monitor 300 and the HMD described above into consideration, then a three-dimensional video can be presented taking advantages of characteristics of the monitor 300 and the HMD.

As one of methods for implementing this, the object classification unit 504 classifies objects based on a position coordinate of the objects in the virtual three-dimensional space.

Figure 5:
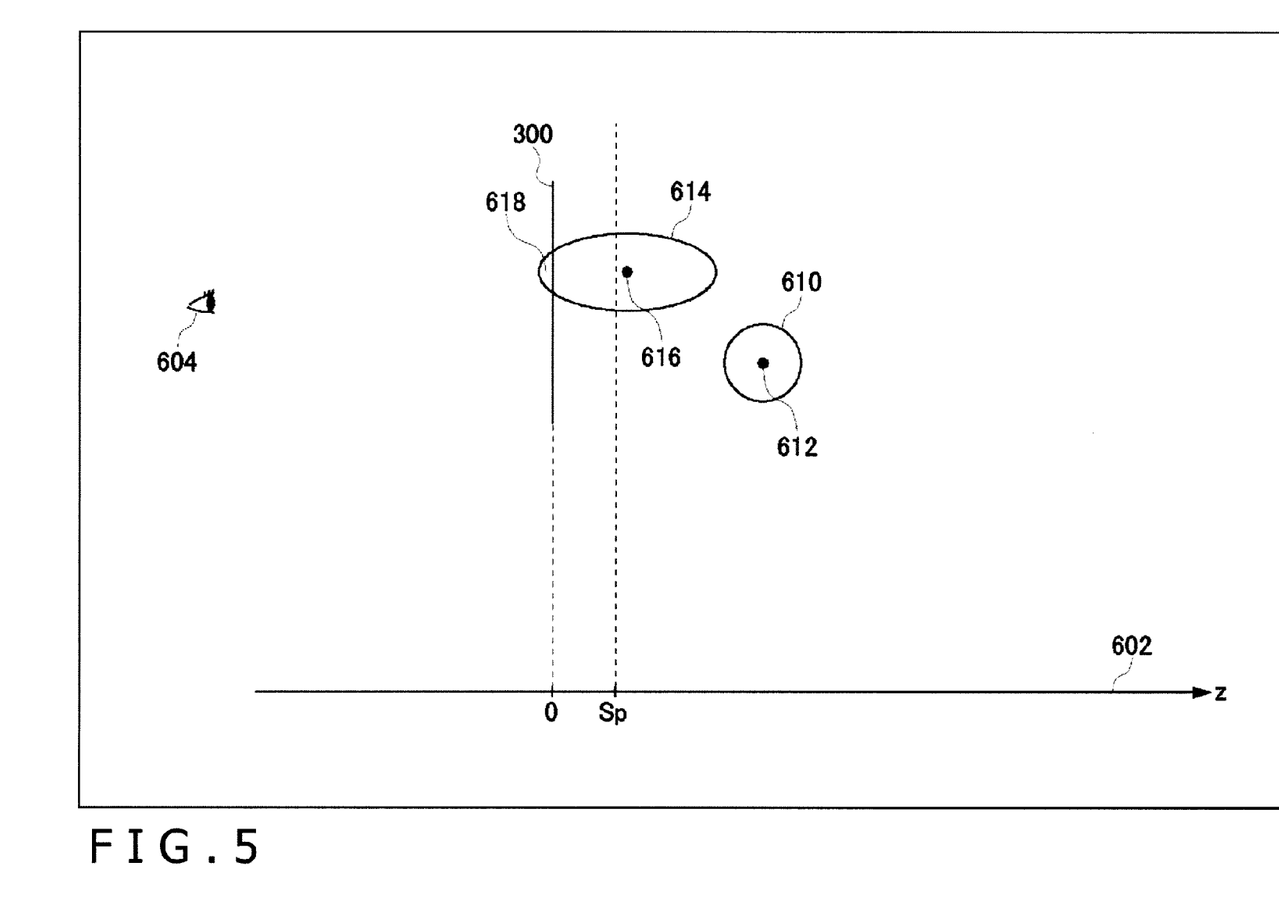
FIG. 5 is a view illustrating an example of object classification by an object classification unit according to the embodiment.

FIG. 5 is a view illustrating an example of object classification by the object classification unit 504 according to the embodiment. As depicted in FIG. 5, a display classification reference coordinate value $S_P$ is determined which is a z coordinate value on the orthogonal coordinate system 602 in the virtual three-dimensional space and is determined in order to classify an object as an object to be displayed on the monitor 300 or as an object to be displayed by the optical transmission type HMD in the three-dimensional video observation device 200. The object classification unit 504 classifies an object of a classification target based on a relationship in magnitude between the z coordinate of the object and the display classification reference coordinate value Sp. Although a particular value of the display classification reference coordinate value Sp may be determined by an experiment taking the characteristics of the monitor 300 and the HMD and so forth into consideration, the particular value is set, for example, to 0 in a proximity of the display area of the monitor 300.

As described hereinabove, the HMD is good at representation of protrusion in comparison with the monitor 300. Therefore, when an object is to be displayed on the visual point 604 side with respect to the display classification reference coordinate value Sp, namely, when the z coordinate value of the object is lower than the display classification reference coordinate value Sp, the object classification unit 504 classifies the object as an object to be displayed on the optical transmission type HMD in the three-dimensional video observation device 200.

Referring to FIG. 5, reference sign 612 denotes a position of a center of gravity of the spherical object 610. As depicted in FIG. 5, a z coordinate value of the center 612 of gravity of the spherical object 610 is higher than the display classification reference coordinate value Sp. In this case, the object classification unit 504 classifies the spherical object 610 as an object to be displayed on the monitor 300. Since also the value of the z coordinate of a center 616 of gravity of an elliptic object 614 is higher than the display classification reference coordinate value Sp, the object classification unit 504 classifies the spherical object 610 as an object to be displayed on the monitor 300.

The HMD and the monitor 300 are good at different representations. Therefore, if one certain object is displayed on both of the HMD and the monitor 300, then a connection on a boundary plane may possibly be unnatural. For example, a portion 618 of the elliptic object 614 depicted in FIG. 5 exists on the visual point 604 side with respect to the display area of the monitor 300 while the remaining portion of the elliptic object 614 exists on the opposite side to the visual point 604 with respect to the display area of the monitor 300. If the portion 618 of the elliptic object 614 id displayed on the HMD while the remaining portion of the elliptic object 614 is displayed on the monitor 300, then the representation of the elliptic object 614 may be unnatural in the display area of the monitor 300 which is the boundary plane.

However, attention should be paid to the fact that the object classification unit 504 classifies not in a unit of a polygon which configures an object but in a unit of an object. Since the object classification unit 504 classifies in a unit of an object, even if the portion of the object exists on the visual point 604 side with respect to the display area of the monitor 300, the object classification unit 504 classifies the object as an object to be displayed either on the monitor 300 or on the optical transmission type HMD in the three-dimensional video observation device 200. This can reduce a visual sense of discomfort arising from display of the same object on both of the HMD and the monitor 300.

Figure 6:
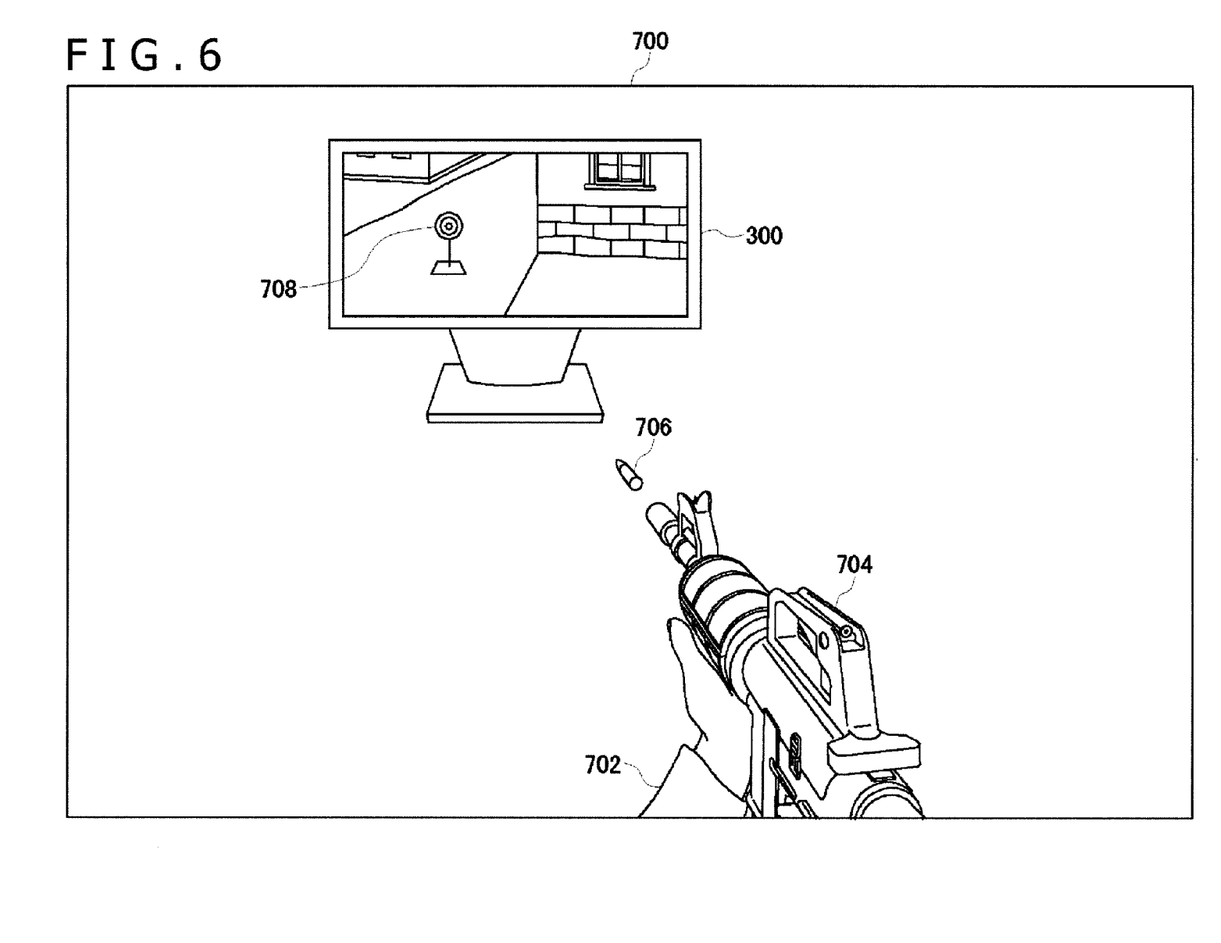
FIG. 6 is a view illustrating another example of object classification by the object classification unit according to the embodiment.

FIG. 6 is a view illustrating another example of object classification by the object classification unit 504 according to the embodiment and is a view exemplifying a video displayed when the user observes a region including the monitor 300 through the three-dimensional video observation device 200. In the example depicted in FIG. 6, the user reproduces a game content of an FPS (First Person Shooter). In FIG. 6, an arm 702 of the user itself, a gun 704 set up by the user, a bullet 706 emitted from the gun 704 and so forth are depicted. Here, naturally the arm 702 exists actually. The gun 704 may be an actually existing replica prepared in order to play the game content or may be a virtual AR (Augmented Reality) image produced by the object acquisition unit 502 and displayed on the optical transmission type HMD. It is to be noted that the AR image is hereinafter described.

It is assumed that the user tries to hit a target 708 displayed on the monitor 300 with the bullet 706. Here, it is assumed that the bullet 706 is an object produced in the virtual three-dimensional space by the object acquisition unit 502 and the target 708 is positioned on the opposite side to the user with respect to the display area of the monitor 300 in the virtual three-dimensional space.

If the bullet 706 is issued toward the target 708, then the bullet 706 jumps out from a discharge opening of the gun 704 positioned on the user side with respect to the display area of the monitor 300 and soon comes to the display area of the monitor 300 and finally arrives at the target 708 positioned on the opposite side to the user with respect to the display area of the monitor 300. Accordingly, according to the classification based on the position coordinate of the object described above, the object classification unit 504 classifies the bullet 706 so as to be displayed on the HMD when the bullet 706 exists on the user side with respect to the display area of the monitor 300 but so as to be displayed on the monitor 300 when the bullet 706 is positioned on the opposite side to the user with respect to the display area of the monitor 300.

Here, since it is assumed that the monitor 300 is a three-dimensional television set of the frame sequential type, the frame rate of videos presented by the HMD is higher than that of videos presented by the monitor 300. Accordingly, where the monitor 300 is a three-dimensional television set of the frame sequential type, an object which moves at a high speed like the bullet 706 is preferably displayed on the HMD irrespective of its position coordinate. Therefore, the object classification unit 504 may classify an object based on the relationship in magnitude between a display classification reference speed value $S_S$ and a rate of change of the position coordinate of the object. More particularly, when a rate of change of the z coordinate of an object in the virtual three-dimensional space is higher than the display classification reference speed value $S_S$, the object classification unit 504 classifies the object as an object to be displayed on the optical transmission type HMD in the three-dimensional video observation device 200. By presenting an object of a high rate of change on a presentation device of a higher frame rate, the visibility of a fast-moving object by the user can be improved.

Here, the "display classification reference speed value $S_S$" is a reference speed determined for classification regarding whether an object is to be displayed on the monitor 300 or to be displayed on the optical transmission type HMD in the three-dimensional video observation device 200. The particular value of the display classification reference speed value $S_S$ may be determined by an experiment taking the frame rates of the monitor 300 and the HMD and so forth into consideration. Thus, it becomes possible to take advantage of the characteristics of the frame rate of the monitor 300 and the HMD to present a three-dimensional video such that, for example, a background of a distant view with less motion or the like is displayed on the monitor 300.

Figure 7:
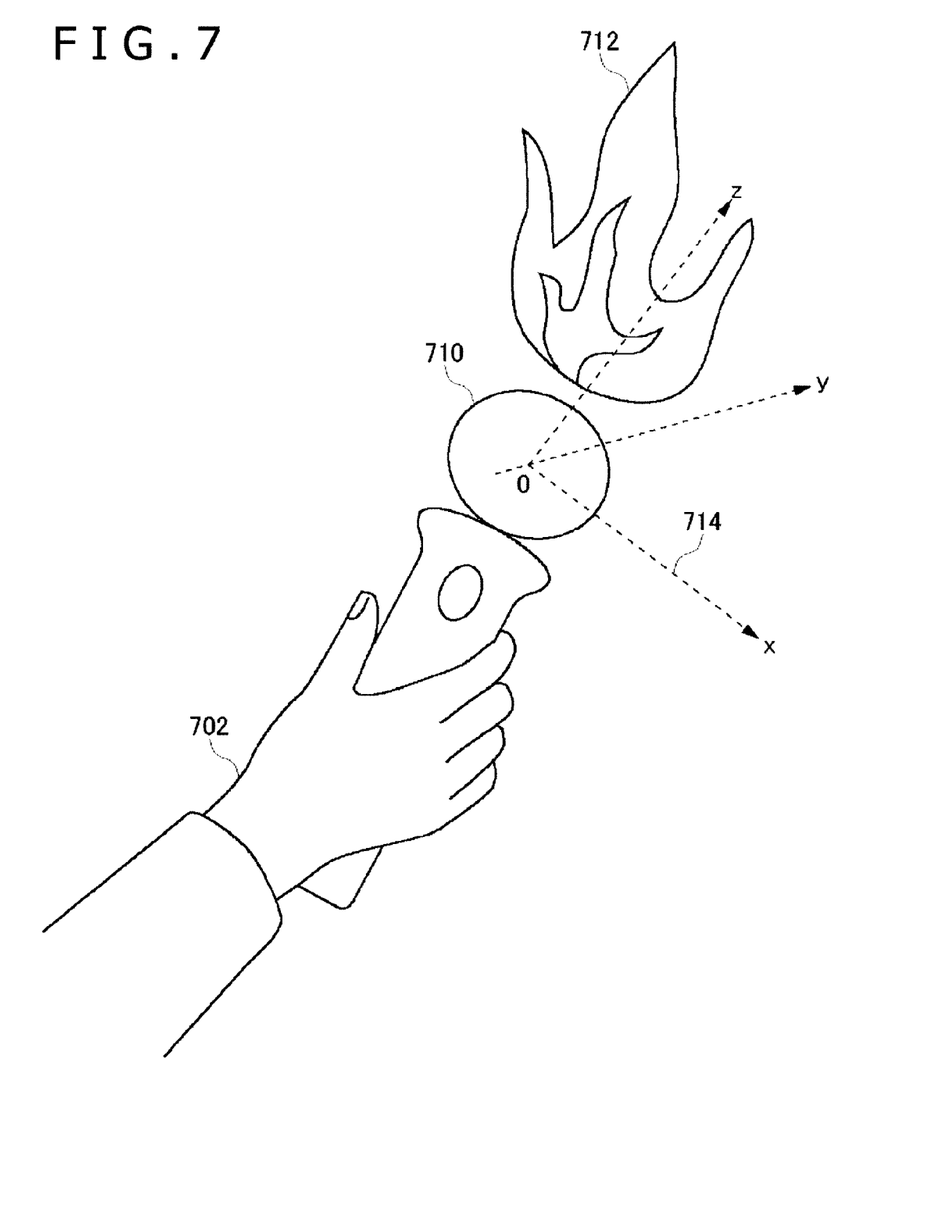
FIG. 7 is a view illustrating a further example of object classification by the object classification unit according to the embodiment.

FIG. 7 is a view illustrating a further example of object classification by the object classification unit 504 according to the embodiment and is a view exemplifying a video including a marker 710 and an AR image 712 linked with the marker. Here, the "marker" is information, for example, utilized by the object acquisition unit 502 which produces an object and is information with which the position of an image to be produced in a virtual three-dimensional space can be specified. Meanwhile, the "AR image" is an object, for example, associated with a marker and is an object whose position and direction vary in an interlocking relationship with a change in position and direction of the marker. In particular, an object produced by the object acquisition unit 502 includes an AR image associated with a marker. It is to be noted that, where a three-dimensional body such as, for example, a cone is used as a marker, the "direction" of the marker in the three-dimensional space can be specified. In such a case, not only the position at which an image is to be produced but also the direction of the image to be produced can be specified.

FIG. 7 illustrates an example of a marker configured from a bar-like grip portion gripped by the arm 702 of the user and a spherical body. In the example illustrated in FIG. 7, the marker 710 is an actually existing body. The image pickup element 204 of the three-dimensional video observation device 200 pans the marker 710 existing in a region including the field of view of the user and transmits a video of the marker 710 to the object acquisition unit 502 which produces an object. The object acquisition unit 502 specifies a position and a direction of the marker 710 from the video picked up by the image pickup element 204 and produces an AR image 712 in an associated relationship with the marker 710 at a corresponding position in the virtual three-dimensional space. In the example depicted in FIG. 7, the AR image 712 is an object representing flame.

Since also the AR image 712 produced by the object acquisition unit 502 is an object, position coordinates are determined. However, the object acquisition unit 502 produces the AR image 712 not in accordance with the orthogonal coordinate system 602 described hereinabove but in accordance with a coordinate system 714 set using the position of the marker 710, with which the AR image 712 is associated, as the origin. Therefore, if the user changes the position and the direction of the marker 710, then also the coordinate system 714 used as a reference for the AR image 712 is changed. When the coordinate system 714 is changed, also the position and the direction of the AR image 712 are changed along with this. It is to be noted that the origin of the coordinate system 714 used as a reference for the AR image 712 need not necessarily be positioned in an overlapping relationship with an associated marker.

An AR image is associated with a marker in this manner, and frequently the marker is an actually existing body. Therefore, the AR image is often presented to the user side with respect to the display area of the monitor 300. Further, since the position of the AR image changes together with movement of the marker, also a speed of movement is comparatively high. Thus, the object classification unit 504 classifies an AR image as an object to be displayed on the optical transmission type HMD in the three-dimensional video observation device 200. The object displayed on the optical transmission type HMD is translucent and allows a video behind the same to pass therethrough. Consequently, also a disadvantage that, even if the user operates the marker to move the AR image, the display of the monitor 300 is interrupted by the AR image and cannot be observed by the user can be prevented.

In order to prevent a similar disadvantage, the object classification unit 504 may classify an object which is an operation target of the user as an object to be displayed on the optical transmission type HMD irrespective of the position coordinates of the object. Here, the "operation target object" is an object whose position coordinates in the virtual three-dimensional space can be changed in response to an operation, for example, of the user who wears the optical transmission type HMD. Consequently, even if the operation target object comes to be displayed between a visual point of the user and an enemy character to be avoided, such a situation that the user loses sight of the enemy character thereby can be prevented.

Figure 8:
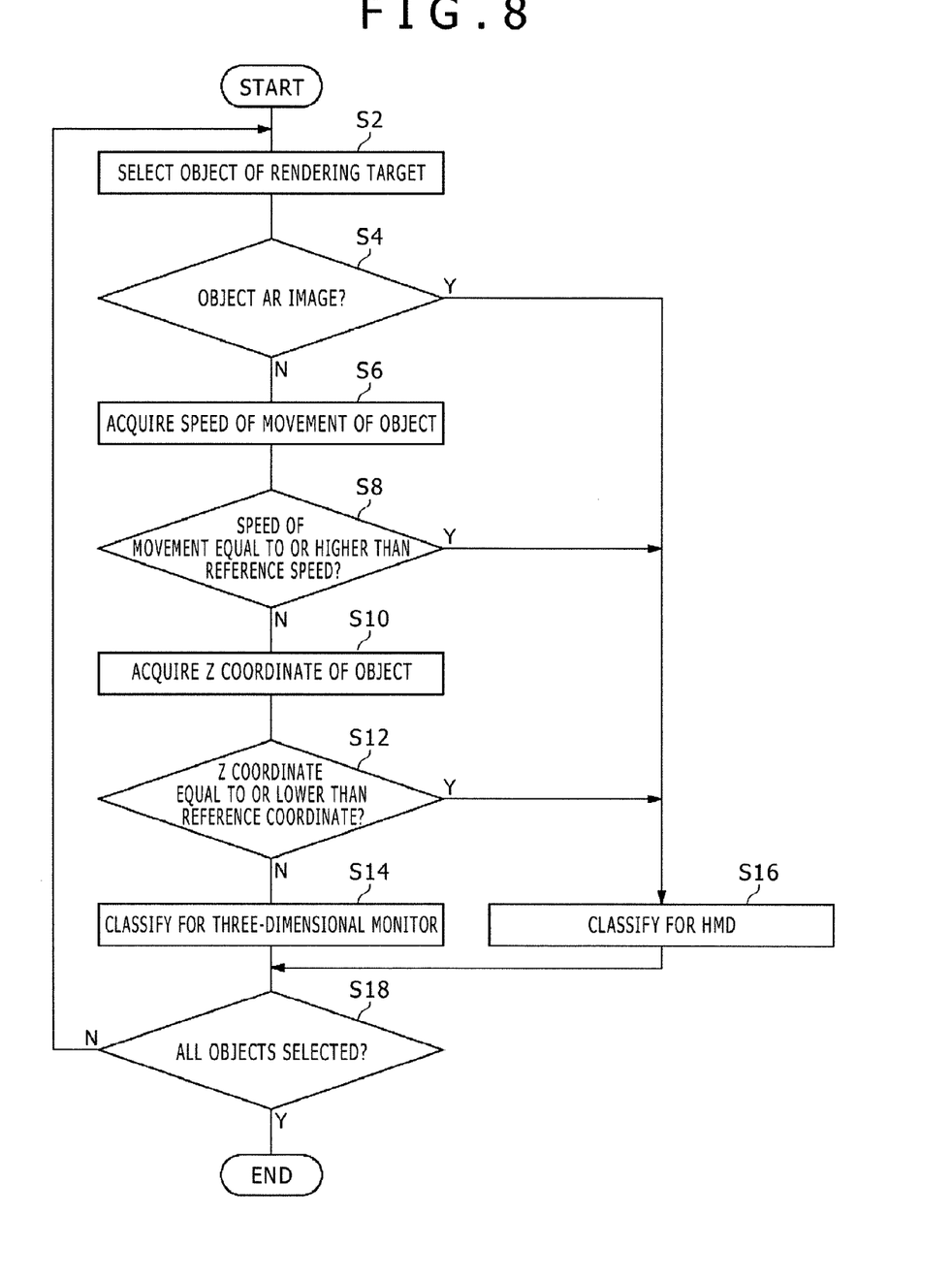
FIG. 8 is a flow chart illustrating a flow of a classification process by the object classification unit according to the embodiment.

FIG. 8 is a flow chart illustrating a flow of a classification process by the object classification unit 504 according to the embodiment. Processing of the present flow chart is started, for example, when the power supply to the video outputting apparatus 500 is made available.

The object classification unit 504 selects an object to be made a target of classification from among a plurality of objects produced by the object acquisition unit 502 (S2). If the selected object is not an AR image (N at S4), then the object classification unit 504 acquires a speed of movement of the selected object in a virtual three-dimensional space (S6).

If the speed of movement of the selected object is lower than the display classification reference speed value $S_S$ (N at S8), then the object classification unit 504 acquires the z coordinate of the selected object in the virtual three-dimensional space (S10). If the z coordinate of the selected object is higher than the display classification reference coordinate value Sp (N at S12), then the object classification unit 504 classifies the selected object as an object to be displayed on the monitor 300 (S14).

When the selected object is an AR image (Y at S4), when the speed of movement of the selected object is equal to or higher than the display classification reference speed value $S_S$ (Y at S8) or when the z coordinate of the selected object is lower than the display classification reference coordinate value Sp (Y at S12), the object classification unit 504 classifies the selected object as an object to be displayed on the optical transmission type HMD in the three-dimensional video observation device 200 (S16).

If all of objects produced by the object acquisition unit 502 are not selected (N at S18), then the object classification unit 504 repeats the processes at steps S2 to S16 described above to continue the classification of an object. If all objects produced by the object acquisition unit 502 are selected by the object classification unit 504 (Y at S18), then the processing of the present flow chart is ended.

A utilization scene of the video presentation system 100 according to the configuration described above is such as described below. The object classification unit 504 classifies objects, which configure a video to be displayed on the video presentation system 100, into objects to be displayed on the optical transmission type HMD in the three-dimensional video observation device 200 and objects to be displayed on the monitor 300 of the frame sequential type based on the display position, speed of movement and so forth of each of the objects. The video outputting unit 506 outputs a video of an object to the optical transmission type HMD in the three-dimensional video observation device 200 or the monitor 300 based on the classification by the object classification unit 504. The user who wears the three-dimensional video observation device 200 to utilize the video presentation system 100 can observe three-dimensional videos which take advantage of the individual characteristics of the monitor 300 and the optical transmission type HMD.

As described above, with the video presentation system 100 according to the embodiment, a three-dimensional video can be represented on both of the monitor 300 and the optical transmission type HMD using a three-dimensional video.

The present invention has been described in connection with the embodiment. The embodiment is illustrative, and it is recognized by those skilled in the art that various modifications are possible to combinations of the components, processes and so forth of the embodiment and that also such modifications fall within the scope of the present invention.

(First Modification)

Although a case in which coordinates of the center of gravity of polygons configuring an object are adopted as coordinates of the object is described, the coordinates of the object are not limited to the coordinates of the center of gravity of polygons. For example, position coordinates of one of polygons which configure an object may be used representatively as the coordinates of the object. At this time, the polygon to be used as a representative may be changed adaptively in response to the positional relationship between objects. In particular, the position coordinates of that one of a plurality of polygons configuring an object that has the shortest distance from any other object may be adopted as the coordinates of the object. This facilitates calculation of a collision determination between objects.

(Second Modification)

While the marker described above is an example configured from a bar-like grip portion and a spherical body, the marker is not limited to this but may be any information which can specify a position. Various variations may be applicable as the marker such as, for example, an image or a moving picture displayed on a monitor, an image printed on a card or a paper sheet, a body of a specific shape such as a circular shape or a star shape, a specific color, a silhouette or face of a person or an animal, a package or an appearance of a commodity, and a position indicated by specific position information by the GPS or the like. Where a three-dimensional body such as, for example, a cone is used as the marker, the "direction" of the marker in the three-dimensional space can be specified. In such a case, not only the position at which an image is to be produced but also the direction of the image to be produced can be specified.

(Third Modification)

While a case in which a user who wears the three-dimensional video observation device 200 solely utilizes a content reproduced by the video presentation system 100 is described above, a plurality of three-dimensional video observation devices 200 may be prepared such that the same content is shared by a plurality of users. In particular, a case in which two or more users enjoy the same game content may be applicable. At this time, a substance, such as, for example, a substance of cards of card game or tiles of mah-jong game, to be presented to each user may be displayed on the optical transmission type HMD worn by the user. This can be implemented by the object classification unit 504 acquiring information indicative of to which user an object is to be presented from the object acquisition unit 502 and classifying the object. This makes it possible to display information to be shared by users such as a background or a discarded tile and information to be presented for each user separately from each other.

(Fourth Modification)

Although the foregoing description is given assuming that the monitor 300 is a 3 television set which displays a three-dimensional video, it is difficult for a television set of the conventional type, wherein the monitor 300 displays a two-dimensional video, to present parallax images appropriately to a user. Therefore, in the case where the monitor 300 is a television set of the conventional type or where the monitor 300 is used as a television set of the conventional type, the video outputting apparatus 500 outputs one of a parallax image for the left eye and a parallax image for the right eye. Alternatively, the video outputting apparatus 500 may produce a two-dimensional video by projective transformation of an object placed in a virtual three-dimensional space to the display area of the monitor 300 so as to be displayed on the monitor 300.

REFERENCE SIGNS LIST

100 Video presentation system, 200 Three-dimensional video observation device, 202 Presentation unit, 204 Image pickup element, 206 Housing, 300 Monitor, 400 Information processing apparatus, 500 Video outputting apparatus, 502 Object acquisition unit, 504 Object classification unit, 506 Video outputting unit, 508 Synchronizing signal production unit, 510 Output controlling section, 512 First buffer, 514 Second buffer, 602 Orthogonal coordinate system, 604 Visual point, 612 Center of gravity, 616 Center of gravity, 710 Marker, 712 AR image

INDUSTRIAL APPLICABILITY

The present invention can be utilized for a video outputting apparatus, a three-dimensional video observation device, a video presentation system including the video outputting apparatus and the three-dimensional video observation device, and a video outputting method.

The invention claimed is:

1. A video outputting apparatus, comprising:
an object classification unit configured to classify objects placed in a virtual three-dimensional space into objects to be displayed on an optical transmission type HMD (head mounted display) and objects to be displayed on a three-dimensional (3D) monitor which is observed through an optical shutter in the optical transmission type HMD,
wherein the object classification unit classifies the objects based upon a distance of each object measured from the 3D monitor,
wherein, if the distance of an object is less than a predetermined value, the object is displayed on the 3D monitor, and
wherein, if the distance of the object is greater than or equal to the predetermined value, the object is displayed on the optical transmission type HMD; and a video outputting unit configured to output a video of the objects to the 3D monitor or the optical transmission type HMD based on the classification by the object classification unit,
wherein the virtual three-dimensional space has an orthogonal coordinate system of an x axis, a y axis, and a z axis set thereto, and an xy plane defined by the x axis and the y axis extends in parallel to a display area of the 3D monitor,
wherein the classification of each object is reevaluated for each frame of the video such that display of each object transitions from the optical transmission type HMD if a z-distance of the object becomes less than the predetermined value and transitions from the 3D monitor to the optical transmission type HMD if the z-distance of the object becomes equal to or greater than the predetermined value.

2. The video outputting apparatus according to claim 1, wherein the object classification unit classifies an object determining the coordinate of a center of gravity of a plurality of polygons which configure the object as the coordinate of the object.

3. The video outputting apparatus according to claim 1, wherein the optical transmission type HMD includes an image pickup element for picking up an image of a plurality of image pickup objects existing in a region including a field of view of a user who wears the optical transmission type HMD,
the objects placed in the virtual three-dimensional space include a plurality of AR (Augmented Reality) images, each AR image being associated with a unique pickup object from the plurality of pickup objects,
wherein each AR image is produced and located in the virtual three-dimensional space using the associated unique pickup object as a marker, and
the object classification unit classifies the plurality of AR images as objects only to be displayed on the optical transmission type HMD.

4. The video outputting apparatus according to claim 1, wherein the objects placed in the virtual three-dimensional space include an operation target object whose position coordinate in the virtual three-dimensional space can be changed in response to an operation of the user who wears the optical transmission type HMD, and
the object classification unit classifies the operation target object as an object to be displayed on the optical transmission type HMD.

5. A video presentation system, comprising:
a three-dimensional (3D) monitor of a frame sequential type;
a three-dimensional video observation device including an optical transmission type HMD (head mounted display) and an optical shutter to be used for observation of the three-dimensional 3D monitor;
an object classification unit configured to classify objects placed in a virtual three-dimensional space into objects to be displayed on the optical transmission type HMD and objects to be displayed on the three-dimensional 3D monitor;
wherein the virtual three-dimensional space has an orthogonal coordinate system of an x axis, a y axis, and a z axis set thereto, and an xy plane defined by the x axis and the y axis extends in parallel to a display area of the 3D monitor,
wherein the object classification unit classifies the objects based upon a z-distance of each object measured from the 3D monitor, wherein, if the z-distance of an object is less than a predetermined value, the object is displayed on the 3D monitor, and wherein, if the z-distance of the object is greater than or equal to the predetermined value, the object is displayed on the optical transmission type HMD; and a video outputting unit configured to output a video of the objects to the 3D monitor or the optical transmission type HMD based on the classification by the object classification unit, wherein the classification of each object is reevaluated for each frame of the video such that display of each object transitions from the optical transmission type HMD if the z-distance of the object becomes less than the predetermined value and transitions from the 3D monitor to the optical transmission type HMD if the z-distance of the object becomes equal to or greater than the predetermined value.

6. The video presentation system according to claim 5, wherein the object classification unit further classifies an object based on a relationship in magnitude between a display classification reference speed value determined in order to classify an object regarding whether the object is to be displayed on the 3D monitor or the optical transmission type HMD and a speed of change of a z-coordinate of the object.

7. The video presentation system according to claim 6, wherein the object classification unit classifies an object in the virtual three-dimensional space as an object to only be displayed on the optical transmission type HMD and not on the 3D monitor when the speed of change of the z-coordinate of the object is higher than the display classification reference speed value.

8. A video outputting method, comprising:

classifying objects placed in a virtual three-dimensional space based upon a z-distance of each object measured from a 3D monitor into objects to be displayed on an optical transmission type HMD (head mounted display) and objects to be displayed on the 3D monitor which is observed through an optical shutter in the optical transmission type HMD by a user who wears the optical transmission type HMD, wherein the virtual three-dimensional space has an orthogonal coordinate system of an x axis, a y axis, and a z axis set thereto, and an xy plane defined by the x axis and the y axis extends in parallel to a display area of the 3D monitor, wherein, if the z-distance of an object is less than a predetermined value, the object is displayed on the 3D monitor, and wherein, if the z-distance of the object is greater than or equal to the predetermined value, the object is displayed on the optical transmission type HMD; and outputting a video of each object to the 3D monitor or the optical transmission type HMD based upon the classification of each object, wherein the classification of each object is reevaluated for each frame of the video such that display of each object transitions from the optical transmission type HMD if the z-distance of the object becomes less than the predetermined value and transitions from the 3D monitor to the optical transmission type HMD if the z-distance of the object becomes equal to or greater than the predetermined value.

9. A non-transitory computer readable medium having stored thereon a program for a computer, the program comprising:

classifying objects placed in a virtual three-dimensional space based upon a z-distance of each object measured from a 3D monitor into objects to be displayed on an optical transmission type HMD (head mounted display) and objects to be displayed on the 3D monitor which is observed through an optical shutter in the optical transmission type HMD by a user who wears the optical transmission type HMD, wherein the virtual three-dimensional space has an orthogonal coordinate system of an x axis, a y axis, and a z axis set thereto, and an xy plane defined by the x axis and the y axis extends in parallel to a display area of the 3D monitor, wherein, if the z-distance of an object is less than a predetermined value, the object is displayed on the 3D monitor, and wherein, if the z-distance of the object is greater than or equal to the predetermined value, the object is displayed on the optical transmission type HMD; and outputting a video of each object to the 3D monitor or the optical transmission type HMD based upon the classification of each object, wherein the classification of each object is reevaluated for each frame of the video such that display of each object transitions from the optical transmission type HMD if the z-distance of the object becomes less than the predetermined value and transitions from the 3D monitor to the optical transmission type HMD if the z-distance of the object becomes equal to or greater than the predetermined value.

10. The video presentation system according to claim 6, wherein the object classification unit classifies an object as an object only to be displayed on the optical transmission type HMD and not on the 3D monitor if the speed of change of the z-coordinate of the object is greater than a predetermined threshold speed.

* * * * *